(12) United States Patent
Ryu et al.

(10) Patent No.: US 7,592,792 B2
(45) Date of Patent: Sep. 22, 2009

(54) POWER SUPPLY

(75) Inventors: Takashi Ryu, Kyoto (JP); Hiroki Akashi, Osaka (JP); Takuya Ishii, Osaka (JP); Hiroshi Saito, Tokyo (JP)

(73) Assignee: Panasonic Corporation, Osaka (JP)

( * ) Notice: Subject to any disclaimer, the term of this patent is extended or adjusted under 35 U.S.C. 154(b) by 379 days.

(21) Appl. No.: 11/547,487

(22) PCT Filed: Mar. 24, 2005

(86) PCT No.: PCT/JP2005/005413

§ 371 (c)(1),
(2), (4) Date: Sep. 29, 2006

(87) PCT Pub. No.: WO2005/099074

PCT Pub. Date: Oct. 20, 2005

(65) Prior Publication Data

US 2008/0273354 A1    Nov. 6, 2008

(30) Foreign Application Priority Data

Mar. 31, 2004  (JP) .............................. 2004-107072

(51) Int. Cl.
*G05F 1/00* (2006.01)
*G05F 1/29* (2006.01)
(52) U.S. Cl. ........................................ 323/284; 323/285
(58) Field of Classification Search ................. 323/280, 323/273–277, 222, 224, 225, 259, 282, 284, 323/285; 363/21.06
See application file for complete search history.

(56) References Cited

U.S. PATENT DOCUMENTS 5,631,494 A    5/1997   Sakurai et al.

(Continued)

FOREIGN PATENT DOCUMENTS

JP          7-86587 A      3/1995

(Continued)

OTHER PUBLICATIONS

International Preliminary Report on Patentability for Application No. PCT/JP2005/005413 dated Oct. 19, 2006.

(Continued)

*Primary Examiner*—Jessica Han
*Assistant Examiner*—Emily Pham
(74) *Attorney, Agent, or Firm*—RatnerPrestia (57)    ABSTRACT

There are provided an inductive load current control circuit for detecting and controlling a current flowing to an inductive load with high accuracy, and a power supply.

The inductive load current control circuit includes first and second switch elements connected in series between an input voltage and a ground potential, an inductive load connected to a connection point between the first and second switch elements, a third switch element having one terminal connected to the connection point between the first and second switch elements, a current comparator connected to another terminal of the third switch element to compare an output current of the third switch element with a reference current, decide and output a magnitude relation, and a switch element control circuit that controls transition from a state in which the second switch element is turned on to a state in which the first switch element is turned on according to an output of the current comparator.

6 Claims, 5 Drawing Sheets

U.S. PATENT DOCUMENTS

| | | | |
|---|---|---|---|
| 6,166,528 A | 12/2000 | Rossetti et al. | |
| 6,496,395 B2 * | 12/2002 | Tokunaga et al. | 363/97 |
| 6,933,706 B2 | 8/2005 | Shih | |
| 7,061,213 B2 | 6/2006 | Yoshida | |
| 2005/0057228 A1 | 3/2005 | Shih | |
| 2005/0057238 A1 | 3/2005 | Yoshida | |
| 2007/0008757 A1 * | 1/2007 | Usui et al. | 363/125 |
| 2007/0080671 A1 * | 4/2007 | Qahouq et al. | 323/282 |
| 2008/0273354 A1 * | 11/2008 | Ryu et al. | 363/21.06 |

FOREIGN PATENT DOCUMENTS

| | | |
|---|---|---|
| JP | 11-164552 A | 6/1999 |
| JP | 2001-136737 A | 5/2001 |
| JP | 2004-96982 A | 3/2004 |
| JP | 2005-94994 A | 4/2005 |

OTHER PUBLICATIONS

Japanese and English language International Search Report for PCT/JP2005/005413, dated Jun. 21, 2005.

* cited by examiner

POWER SUPPLY

THIS APPLICATION IS A U.S. NATIONAL PHASE APPLICATION OF PCT INTERNATIONAL APPLICATION PCT/JP2005/005413.

TECHNICAL FIELD

The present invention relates to an inductive load current control circuit and a power supply.

BACKGROUND ART

An inductive load current control circuit which is used in a switching power supply, an inverter for controlling a motor, or the like, alternately turns on two switch elements connected in series between an input voltage and a ground potential, and controls a time period during which one of the two switch elements is turned on, and thus controls a current (inductor current) flowing to an inductor (inductive load) connected to a connection point between the two switch elements. In recent years, a technique for accurately detecting the current flowing to an inductive load is required for a power supply such as a DC-DC converter, which controls the inductive load by using a switch element.

A step-down DC-DC converter which outputs a voltage lower than an input voltage will be described below. In step-down DC-DC converters, a converter called synchronous rectification type alternately turns on and off first and second switch elements that are connected in series between an input voltage and a ground potential, and thus a potential at a connection point between the two switch elements is alternately conducted to the input voltage and the ground potential. The voltage is then averaged by a low-pass filter having an inductor and a capacitor to output a DC voltage to an output terminal. An error voltage obtained by amplifying a difference voltage between the output voltage and the reference voltage is converted into a pulse-width modulation signal by a PWM converter, and a ratio (duty cycle) of times for alternately turning on/off the first and second switch elements is controlled, so that an output voltage is controlled to be a target value.

Further, in a technique in recent years, a control method of monitoring a current flowing to an inductor and switching on and off when the current reaches a predetermined current is employed. As the method of monitoring an inductor current, two methods are known. One of the methods is a method of monitoring the current flowing into the first switch element disposed closer to the input voltage of the first and second switch elements connected in series with each other between the input voltage and the ground potential, and controlling the maximum value of a triangle-shaped current flowing into the inductor. The other method is a method of monitoring a current flowing into the second switch element disposed closer to the ground potential of the first and second switch elements connected in series with each other between an input voltage and a ground potential, and controlling the minimum value of a triangle-shaped current flowing into the inductor.

It is known that when a step-down DC-DC converter is operated in a low duty cycle, a high-speed switching frequency may be applied more easily by controlling the minimum value of a current than by controlling the maximum value of the current (see JP-A-2001-136737, for example).

Figure 5:
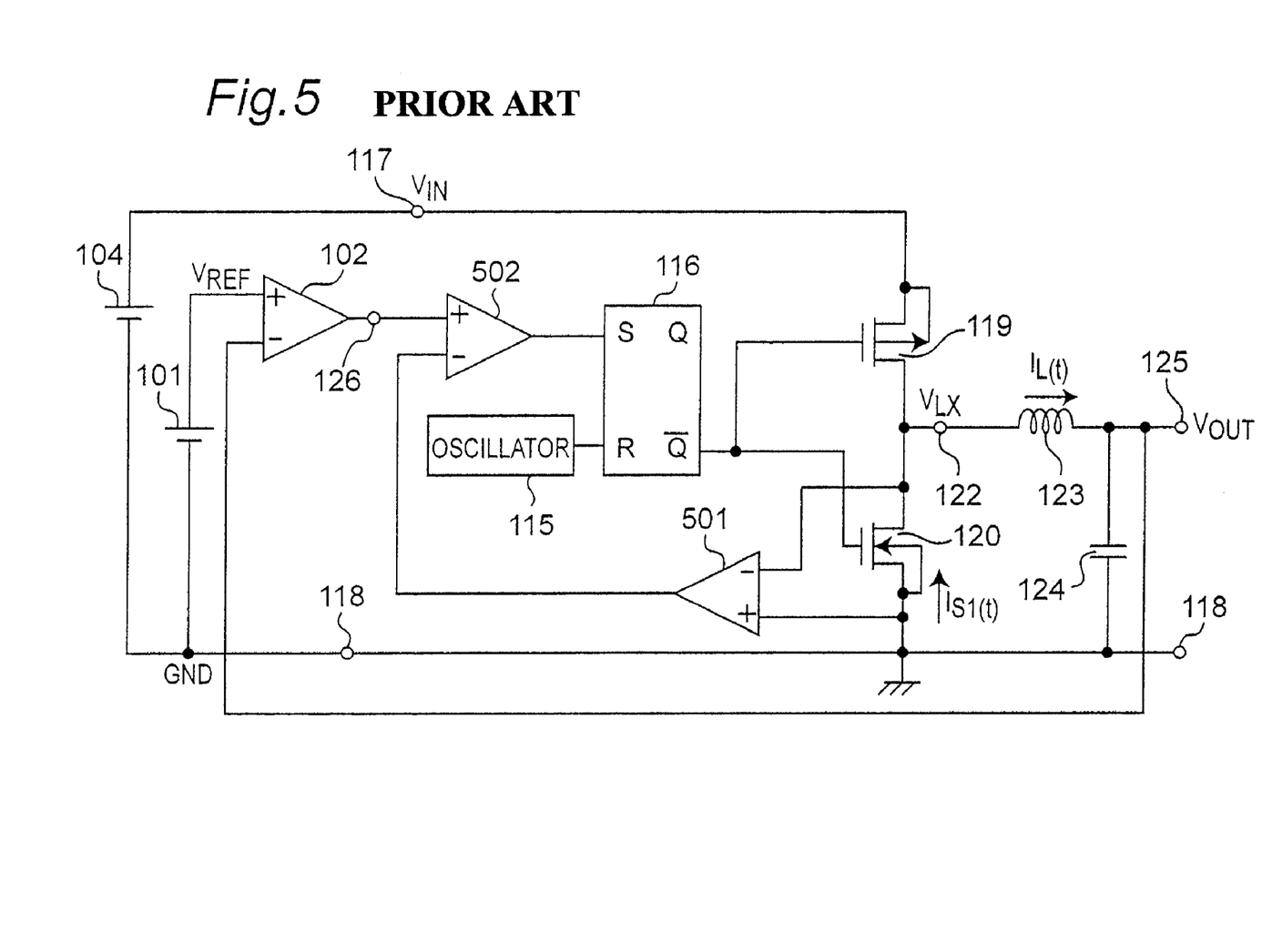
FIG. 5 is a circuit diagram of a step-down DC-DC converter having a conventional inductive load current control circuit.

With reference to FIG. 5, the following describes a conventional step-down DC-DC converter disclosed in JP-A-2001-136737 which uses the method of controlling the minimum value of a triangle-shaped current flowing to an inductor.

FIG. 5 is a circuit diagram showing the configuration of a typical conventional step-down DC-DC converter (power supply). An input terminal 117 is connected to one terminal of an external power supply 104 which outputs a DC voltage. Another terminal of the external power supply 104 is connected to a ground terminal 118 connected to a ground potential. The conventional step-down DC-DC converter (power supply) shown in FIG. 5 inputs the DC voltage output from the external power supply 104 through the input terminal 117 and the ground terminal 118.

A first switch element (high-potential-side switch element) 119 and a second switch element (low-potential-side switch element) 120 are connected in series with each other between the input terminal 117 and the ground terminal 118. A source of the first switch element (high-potential-side switch element) 119 which is a p-channel FET is connected to the input terminal 117. A source of the second switch element (low-potential-side switch element) 120 which is an N-channel FET is connected to the ground terminal 118.

One terminal of an inductor 123 is connected to a connection point 122 between the drains of the high-potential-side switch element 119 and the switch element of the low-potential-side 120 and an inverted input terminal of a current detecting amplifier 501. Another terminal of the inductor 123 is connected to one terminal of a filter capacitor 124 and an output terminal 125.

An external load (not shown) is connected between the output terminal 125 of the step-down DC-DC converter and the ground terminal 118.

Two input terminals of the current detecting amplifier 501 are connected to both terminals of the switch element of the low-potential-side 120, respectively, and output voltages which are in proportion to the step-down voltage.

A reference voltage generating section 101 outputs a reference voltage $V_{REF}$.

A non-inverted input terminal of an error amplifier 102 is connected to the reference voltage generating section 101 to input the reference voltage $V_{REF}$. The inverted input terminal is connected to the output terminal 125 to input an output voltage $V_{OUT}$. The error amplifier 102 outputs an error voltage obtained by amplifying a difference voltage between the reference voltage $V_{REF}$ and the output voltage $V_{OUT}$ to an error voltage input terminal 126.

A non-inverted input terminal of a comparator 502 is connected to the output terminal of the error amplifier 102 through the error voltage input terminal 126, and the inverted input terminal of the comparator 502 is connected to the output terminal of the current detecting amplifier 501. The comparator 502 compares a voltage which is proportional to the step-down voltage of the switch element of the low-potential-side 120 outputted from the current detecting amplifier 501 with an error voltage output from the error amplifier 102. When the step-down voltage of the switch element of the low-potential-side 120 is lower than the error voltage, the comparator 502 outputs High, and otherwise, the comparator 502 outputs Low.

An oscillator 115 outputs a clock of an operation frequency of the step-down DC-DC converter in FIG. 5.

A switch element control circuit 116 is a set/reset flip-flop of a leading edge trigger. A set terminal of the switch element control circuit 116 is connected to the comparator 502 to input an output voltage from the comparator 502. A reset terminal of the switch element control circuit 116 is connected to the oscillator 115 to input a clock output from the oscillator 115.

The switch element control circuit 116 which is an RS flip-flop, is set in a reset state when the clock input to the reset terminal is switched from Low to High. In the reset state, the switch element control circuit 116 sets the first switch element 119 in a cutoff state and sets the switch element 120 in a conductive state.

The switch element control circuit 116 is set in a set state when an output voltage from the comparator 502 input to the set terminal is switched from Low to High. In the set state, the switch element control circuit 116 turns on the first switch element 119 and turns off the second switch element 120.

In FIG. 5, the current detecting amplifier 501, the comparator 502, the oscillator 115, the switch element control circuit 116, the input terminal 117, the ground terminal 118, the first switch element 119, the second switch element 120, the inductor 123, the output terminal 125, and the error voltage input terminal 126 constitute a conventional inductive load current control circuit.

An operation of the step-down DC-DC converter using the conventional inductive load current control circuit having the above configuration will be described below. An external load (not shown) is connected between the output terminal 125 of the step-down DC-DC converter and the ground terminal 118.

The switch element control circuit 116 is set in a set state at a start-up. The switch element control circuit 116 turns on the first switch element 119 of the high-potential-side, and turns off the second switch element 120 of the low-potential-side. A current is supplied from the external power supply 104 to the filter capacitor 124 and the external load through the input terminal 117, the first switch element 119, and the inductor 123. An inductor current IL(t) increases while time t passes, and energy is accumulated in the inductor 123. When this state is continued, the inductor current continuously increases with time.

The switch element control circuit 116 inputs a clock output by the oscillator 115 from the reset terminal every predetermined time. The switch element control circuit 116 is set in a reset state when a clock input from the reset terminal is switched from Low to High. The switch element control circuit 116 turns off the first switch element 119 of the high-potential-side and turns on the second switch element 120 of the low-potential-side.

The inductor 123 has such characteristic that the inductor current continuously flows while holding a previous state by the energy accumulated in the inductor 123. The inductor current is supplied from the ground terminal 118 to the external load connected to the output terminal 125 through the switch element of the low-potential-side 120 and the inductor 123.

When the switch element of the low-potential-side 120 is turned on from off, a voltage which is output from the current detecting amplifier 501 and in proportion to the step-down voltage of the switch element of the low-potential-side 120 is higher than the error voltage output from the error amplifier 102. The comparator 502 outputs Low. In this state, the inductor current decreases with time.

When the step-down voltage of the second switch element 120 of the low-potential-side becomes lower than the error voltage, the output from the comparator 502 is switched from Low to High. Thus, the switch element control circuit 116 is set in a set state again to turn off the second switch element 120 of the low-potential-side and to turn on the first switch element 119 of the high-potential-side. A current is supplied from the external power supply 104 to the filter capacitor 124 and the external load through the input terminal 117, the first switch element 119, and the inductor 123. The inductor current IL(t) increases with time t, and energy is accumulated in the inductor 123.

The above operation is repeated. When the circuit is in an equilibrium operation state, with respect to the two input signals of the comparator 502, the minimum value of the triangular-shaped voltages output from the current detecting amplifier 501 is equal to the value of the error voltage output from the error amplifier 102.

Thus, the conventional step-down DC-DC converter (power supply) monitors a current flowing in the second switch element 120 of the low-potential-side to control the minimum value of triangular-shaped currents flowing to the inductor 123.

Patent Document 1: JP-A-2001-136737

DISCLOSURE OF THE INVENTION

Problems to be Solved by the Invention

The conventional step-down DC-DC converter compares a step-down voltage in the second switch element of the low-potential-side with an error voltage. The step-down voltage in the second switch element of the low-potential-side is expressed by a product of a conducting resistance of the second switch element and the inductor current. As the switch element, a FET (Field Effect transistor) is generally used. However, the conducting resistance of the switch element has a large individual error due to a fluctuation of a semiconductor manufacturing process. In this case, a step-down voltage in the second switch element of the low-potential-side has a large individual error to a constant inductor current.

Since an input offset voltage of the current detecting amplifier 501 is also about ±10 mV in general, a gain of the current detecting amplifier 501 has a fluctuation. When the input offset voltage is added to the fluctuation of the step-down voltage in the second switch element 120 of the low-potential-side and the amplifier 501 amplifies an obtained value by the gain having the fluctuation, an output from the current detecting amplifier 501 has a larger individual error.

As described above, when the circuit is in an equilibrium operation state, with respect to two input signals of the comparator, the minimum value of triangular-shaped voltages output from the current detecting amplifier 501 is equal to an error voltage. Therefore, the error voltage equal to the output from the current detecting amplifier also has a large individual error. As a result, an output voltage of a DC-DC converter has a large individual error.

In place of amplification of the step-down voltage in the switch element 120 of the low-potential-side, when a resistor with high-precision is inserted in series between the switch element 120 of the low-potential-side and the ground terminal 118 to amplify a step-down voltage of the resistor, the individual error of the step-down voltage can be reduced. However, an error caused by the current detecting amplifier 501 cannot be eliminated. Since the step-down voltage in the resistor causes an increase in power loss, the power efficiency of the DC-DC converter is disadvantageously deteriorated.

It is an object of the present invention to provide an inductive load current control circuit which accurately detect and control a current (inductor current) flowing to an inductive load without deteriorating power efficiency and a power supply.

Means for Solving the Problems

In order to solve the above problem, the present invention has the following configurations.

An inductive load current control circuit according to one aspect of the present invention includes: an input terminal that inputs an input voltage; an output terminal that outputs an output voltage; a reference power source that is a current source having a current driving capability of outputting a reference current; first and second switch elements which are connected in series between the input terminal and a ground potential; an inductive load that has one terminal connected to a connection point between the first switch element and the second switch element and another terminal connected to the output terminal to output the output voltage; a third switch element that has one terminal connected to the connection point between the first switch element and the second switch element; a current comparator that has one terminal connected to an output terminal of the reference power source and another terminal connected to another terminal of the third switch element, the current comparator comparing a current driving capability of the third switch element with a current driving capability of the reference current to decide and output a magnitude relation; and a switch element control circuit that alternately controls a first state and a second state, and controls transition from the second state to the first state according to an output of the current comparator. In the first state, the first switch element is turned on and the second switch element and the third switch element are turned off to cause a current to flow from the input voltage to the inductive load. In the second state, the first switch element is turned off and the second switch element and the third switch element are turned on to cause a current to flow from the ground potential to the inductive load through the second switch element by energy accumulated in the inductive load at the first state.

According to the invention, there can be realized the inductive load current control circuit which accurately detects a current flowing to the inductive load to control a current in the inductive load by using the third switch element and the current comparator. Typically, the inductive load current control circuit accurately detects the minimum value of triangular-shaped currents flowing to the inductive load in order to control a current in the inductive load.

In the inductive load current control circuit according to another aspect of the present invention, the reference power source has a voltage source and a resistor that are connected in series, and provides a predetermined current from one terminal of the resistor.

In the inductive load current control circuit according to still another aspect of the present invention, the reference power source is a reference current source having a current driving capability of outputting a predetermined reference current, and the inductive load current control circuit controls an amount of the current driving capability of the reference current source in order to control an output voltage of the inductive load.

According to the invention, there can be realized the inductive load current control circuit that controls the amount of the current driving capability of the reference current source in order to control a current flowing to the inductive load to be an arbitrary value.

The inductive load current control circuit according to still another aspect of the present invention, the second switch element and the third switch element are transistors, and conductive resistances of transistors are set such that a current flowing to the third transistor is smaller than a current flowing to the second transistor.

According to the present invention, an inductive load current control circuit which accurately detects a current flowing to the conductive load without causing the third element to adversely affect an output voltage of the inductive load can be realized.

In the inductive load current control circuit according to still another aspect of the present invention, the current comparator has a transistor that has one terminal connected to the reference power source and another terminal connected to the other terminal of the third switch element, and a control terminal. When the control terminal is supplied with a predetermined voltage, the transistor operates such that a potential of a connection point between the other terminal of the transistor and the other terminal of the third switch element approximates to a ground potential. The current comparator outputs a potential of an arbitrary point between the reference power source and one terminal of the transistor or a binary value of the potential as a comparison result.

The third switch is designed to have the same characteristic as that of the second switch element except that the current driving capability of the third switch element is smaller than that of the second switch element. The potential of the other terminal of the third switch element is controlled to be equal to the approximate ground potential and it is possible to achieve a proportionality relation between the current flowing in the third switch element and the current flowing in the second switch element.

According to the present invention, the current flowing in the second switch element can be accurately detected by detecting the current flowing in the third switch element.

A power supply according to one aspect of the present invention includes: a reference voltage generating section that outputs a reference voltage; any one of the above-mentioned inductive load current control circuit; and an error amplifier that compares the reference voltage and the output voltage of the inductive load current control circuit to output an error voltage obtained by amplifying a difference voltage between the reference voltage and the output voltage and the power supply controls a value of the reference current in the inductive load current control circuit to decrease the absolute value of the error voltage.

According to the invention, there can be realized a power supply which accurately detects a current flowing to an inductive load to output a stable output voltage. Typically, the inductive load current control circuit accurately detects the minimum value of triangular-shaped currents flowing to the inductive load.

Effects of the Invention

According to the present invention, there can be realized an inductive load current control circuit which control the current in the inductive load by accurately detecting a current flowing to an inductive load. Typically, the inductive load current control circuit accurately detects the minimum value of triangular-shaped currents flowing to the inductive load in order to control a current in the inductive load.

According to the present invention, there can be realized a power supply which accurately detects a current flowing to the inductive load to output a stable output voltage.

BEST MODE FOR CARRYING OUT THE INVENTION

The best mode for carrying out the invention will be described below in detail with reference to the drawings.

Embodiment 1

Figure 1:
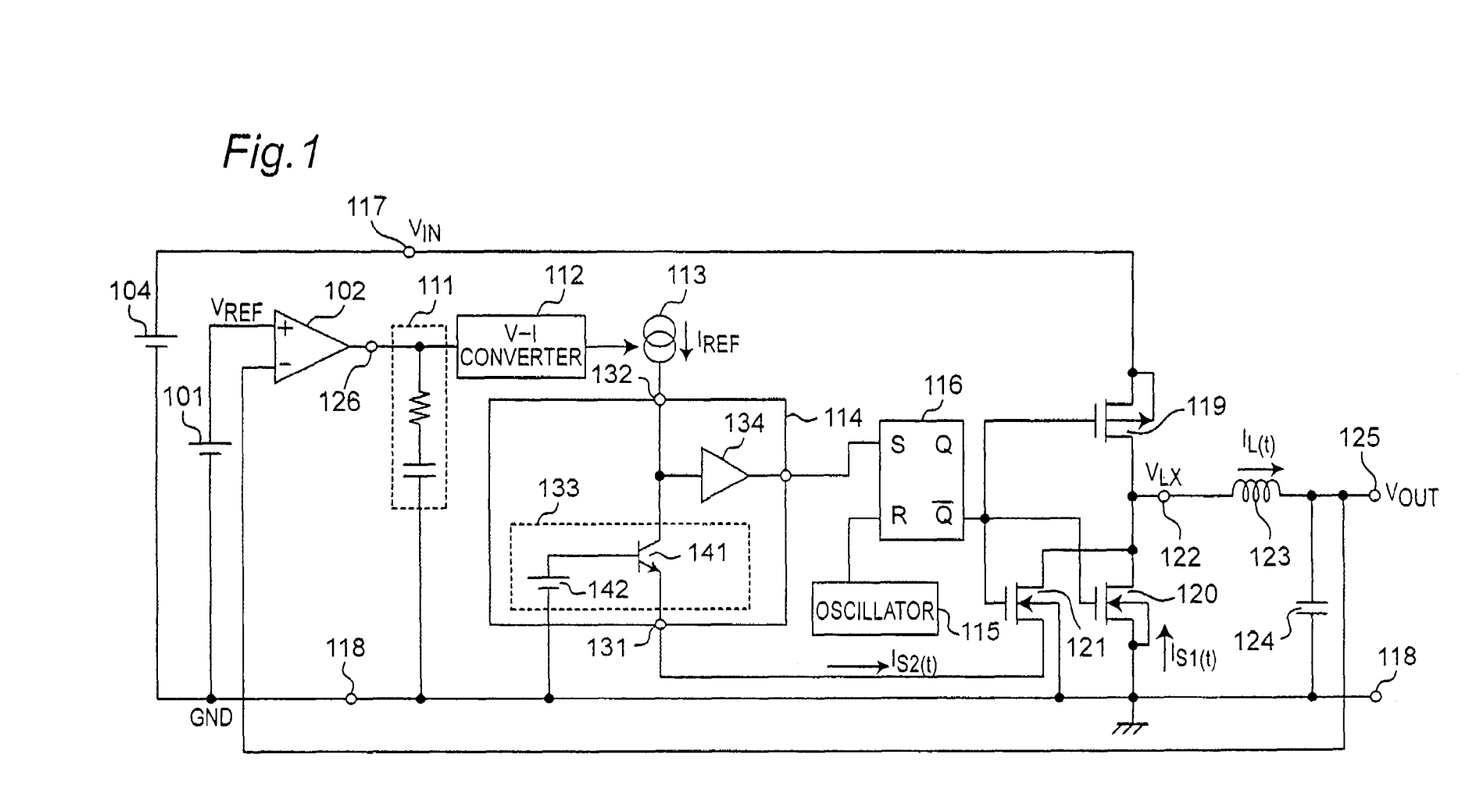
FIG. 1 is a diagram showing the configuration of a power supply according to an embodiment 1 of the present invention.

An inductive load current control circuit and a power supply according to an embodiment 1 of the present invention will be described below with reference to FIG. 1 and FIG. 2. FIG. 1 is a diagram showing the configuration of the power supply according to the embodiment 1 of the present invention. The power supply according to the embodiment 1 is a step-down DC-DC converter.

Elements of the power supply (FIG. 1) according to the embodiment 1 of the present invention, which corresponds to the elements of the conventional example (FIG. 5) are given the same reference numerals as the elements of the conventional example. The inductive load current control circuit according to the embodiment 1 of the present invention is different from the conventional inductive load current control circuit in that a current comparator 114, a third switch element 121, and the like shown in FIG. 1 are used to detect a current in place of the current detecting amplifier 501 and the comparator 502 in FIG. 5.

In FIG. 1, the inductive load current control circuit according to the embodiment 1 has a reference current source 113, a current comparator 114, an oscillator 115, a switch element control circuit 116, an input terminal 117, a ground terminal 118, a first switch element 119, a second switch element 120, a third switch element 121, an inductor 123, an output terminal 125, and an error voltage input terminal 126.

The input terminal 117 is connected to one terminal of the external power supply 104 which outputs a DC voltage $V_{IN}$. Another terminal of the external power supply 104 is connected to the ground terminal 118 connected to the ground potential. A DC voltage $V_{IN}$ output from the external power supply 104 is input to the input terminal 117 and the ground terminal 118.

The first switch element (high-potential-side switch element) 119 and the second switch element (low-potential-side switch element) 120 are connected in series between the input terminal 117 and the ground terminal 118. A source of the first switch element (high-potential-side switch element) 119 being a p-channel FET is connected to the input terminal 117. A source of the second switch element (low-potential-side switch element) 120 being an N-channel FET is connected to the ground terminal 118.

A drain of the third switch element 121 being an N-channel FET is connected to the connection point between drains of the first switch element 119 and the second switch element 120. A gate of the third switch element 121 is connected to the gate of the second switch element 120. The gate of the first, second, and third switch elements 119, 120, and 121 are connected to a Q-bar output terminal (inverted output terminal) of the switch element control circuit 116.

The source of the third switch element 121 is connected to a current output terminal 131 of the current comparator 114. The third switch element 121 being a N-channel FET has the same characteristic as that of the second switch element 120 except that a current driving capability of the third switch element 121 is lower than that of the second switch element 120.

One terminal of the inductor 123 being an inductive load is connected to a connection point 122 of the drains of the first switch element 119, the second switch element 120, and the third switch element 121. Another terminal of the inductor 123 is connected to one terminal of the filter capacitor 124 and the output terminal 125.

An external load (not shown) is connected between the output terminal 125 of the step-down DC-DC converter and the ground terminal 118. The power supply according to the embodiment 1 outputs a predetermined voltage $V_{OUT}$ from the output terminal 125.

The reference voltage generating section 101 outputs a reference voltage $V_{REF}$. The non-inverted input terminal of the error amplifier 102 is connected to the reference voltage generating section 101 to receive the reference voltage $V_{REF}$. The inverted input terminal of the error amplifier 102 is connected to the output terminal 125 to receive the output voltage $V_{OUT}$. The error amplifier 102 amplifies a difference voltage between the reference voltage $V_{REF}$ and the output voltage $V_{OUT}$ to output an error voltage.

The error voltage input terminal 126 is connected to the output terminal of the error amplifier 102 to receive the error voltage.

The phase compensation circuit 111 has a resistor and a capacitor which are connected in series. The resistor is connected to the error voltage input terminal 126, and the capacitor is connected to the ground potential. The phase compensation circuit 111 receives the error voltage, adjusts the phase of the error voltage, and outputs the resultant voltage.

A voltage-current converter (V-I converter) 112 is connected to the phase compensation circuit 111 to convert the received error voltage into a current and output the current.

The reference current source 113 outputs a reference current $I_{REF}$. In the embodiment 1, the reference current $I_{REF}$ is variable. The reference current source 113 determines a current value of the reference current $I_{REF}$ based on the current value output from the voltage-current converter 112. The reference current $I_{REF}$ is made variable based on the current value (that is, the error voltage output from the error amplifier 102 and input to the voltage-current converter 112) output from the voltage-current converter 112 to detect the minimum value of triangular-shaped inductor currents IL(t), to control the inductor current, and to stabilize the output voltage $V_{OUT}$.

The current comparator 114 has a current input terminal 132 connected to the reference current source 113, a voltage stabilizing circuit 133 and a buffer amplifier 134 connected to the current input terminal 132, and the current output terminal 131 connected to the voltage stabilizing circuit 133.

The current comparator 114 inputs the reference current $I_{REF}$ output from the reference current source 113 through the current input terminal 132 and causes a current IS2(t) to flow from the current output terminal 131 to the third switch element 121.

The voltage stabilizing circuit 133 of the current comparator 114 has a transistor 141 connected between the current input terminal 132 and the current output terminal 131 and a voltage source 142 connected between the base of the transistor 141 and the ground potential.

The transistor 141 is a bipolar transistor. A base voltage of the transistor 141 is supplied by a voltage source 142 which outputs a certain voltage corresponding to a base-emitter voltage (about 0.7 V). An emitter of the transistor 141 is connected to the current output terminal 131 and operates such that the voltage of the current output terminal 131 is approximated to the ground potential, that is, 0 V. A collector of the transistor 141 is connected to the current input terminal 132. With this configuration, set potentials of the terminals of the third switch element 121 are almost equal to the set potentials of the terminals of the second switch element 120 the source of which is grounded.

Assuming that [a current driving capability of the third switch element 121]:[a current driving capability of the second switch element 120]=1:a (a>1) is satisfied, a current that is 1/a of the current always flowing in the second switch element 120 flows in the third switch element 121. More specifically, in the embodiment 1, the second switch element 120 and the third switch element 121 have a predetermined ratio of conducting resistances. The current flowing in the third switch element 121 is set to be smaller than the current flowing in the second switch element 120.

When the potential at the connection point between the third switch element 121 and the current output terminal 131 of the current comparator 114 is equal to the ground potential, a current the ratio of which is equal to the inverse number of the ratio of the conducting resistance of the third switch element 121 to the conducting resistance of the second switch element 120 flows in the third switch element 121. The current comparator 114 compares the current $IS2(t)$ with the reference current $I_{REF}$.

When the current (current driving capability of the third switch element 121) $IS2(t)$ flowing in the third switch element 121 is larger than the reference current (current driving capability of the reference current source 113) $I_{REF}$ output from the reference current source 113, the collector potential of the transistor 141 approximates to the ground potential ($Vc<V_{IN}/2$).

When the current driving capability $IS2(t)$ of the third switch element 121 is smaller than the current driving capability $I_{REF}$ of the reference current source 113, the collector potential of the transistor 141 approximates to the DC voltage $V_{IN}$ ($Vc>V_{IN}/2$).

The collector voltage Vc is an output from the current comparator 114 through the buffer amplifier 134.

The buffer amplifier 134 has a threshold value of $1/V_{IN}$ and outputs binary signal of High or Low. The buffer amplifier 134 compares the current driving capability of the third switch element 121 in which a current from the current output terminal 131 flows with the current driving capability $I_{REF}$ of the reference current source 113 which inputs a current through the current input terminal 132, and decides a magnitude relation and outputs a result. More specifically, the buffer amplifier 134 outputs Low when a current flowing through the reference current source 113, the current comparator 114, and the third switch element 121 is larger than the reference current $I_{REF}$, and outputs High when the current is smaller than the reference current $I_{REF}$.

The switch element control circuit 116 is a set/reset flip-flop of leading edge trigger. A set terminal of the switch element control circuit 116 is connected to the output terminal of the buffer amplifier 134. The reset terminal of the switch element control circuit 116 is connected to the oscillator 115. The oscillator 115 outputs a clock having an operation frequency of the step-down DC-DC converter in FIG. 1. The switch element control circuit 116 inputs an output voltage of the current comparator 114 through the set terminal, and inputs a clock output from the oscillator 115 through the reset terminal.

The switch element control circuit 116 becomes in a set state when the output voltage of the current comparator 114 input to the set terminal is switched from Low to High. In the set state, the switch element control circuit 116 turns on the first switch element 119 and turns off the second switch element 120 and the third switch element 121 (a first state).

The switch element control circuit 116 becomes in a reset state when the clock input to the reset terminal is switched from Low to High. In the reset state, the switch element control circuit 116 turns off the first switch element 119 and turns on the second switch element 120 and the third switch element 121 (a second state).

Thus, the switch element control circuit 116 alternately turns on the first switch element 119 and a pair of the second switch element 120 and the third switch element 121 to switch the first state (charging state) and the second state (discharging state) to each other. "Valley current control architecture" is employed. That is, the switching operation from the first state to the second state is executed when predetermined time passes, and the switching operation from the second state to the first state is executed based on an output from the current comparator 114.

An operation of the step-down DC-DC converter having the above-mentioned inductive load current control circuit according to the embodiment 1 will be described below. The switch element control circuit 116 is set in a set state at a start-up to turn on the first switch element 119 of high-potential-side and to turn off the second switch element 120 of low-potential-side and the third switch element 121 of low-potential-side. A current is supplied from the external power supply 104 to the filter capacitor 124 and the external load (not shown) through the input terminal 117, the switch element 119, and the inductor 123. The inductor current IL(t) increases with time t, and energy is accumulated in the inductor 123. When this state is continued, the inductor current continuously increases with time (the first state: the charging state).

Every predetermined time, the switch element control circuit 116 inputs a clock output from the oscillator 115 through the reset terminal. The switch element control circuit 116 becomes in a reset state when the clock input to the reset terminal is switched from Low to High. The switch element control circuit 116 turns off the first switch element 119 of high-potential-side and turns on the second switch element 120 of low-potential-side and the third switch element 121 of low-potential-side (the second state: the electric discharging state).

The inductor current has such characteristic that the inductor current continuously flows in the second state while holding a previous state by the energy accumulated in the inductor 123 in the first state. The inductor current is supplied from the ground terminal 118 to the external load connected to the output terminal 125 through the switch element of the switch element 120 of low-potential-side and the inductor 123.

When the switch element 120 of low-potential-side is turned on from off, the current $IS2(t)$ flowing in the third switch element 121 is larger than the reference current $I_{REF}$. The current comparator 114 outputs Low. In this state, the inductor current IL(t) decreases with time.

The current comparator 114 compares the current $IS2(t)$ flowing from the current output terminal 131 to the third switch element 121 with the reference current $I_{REF}$ to output a comparison result. In the second state, when the current $IS2(t)$ flowing in the third switch element 121 is smaller than the reference current $I_{REF}$, the output voltage of the current comparator 114 is switched from Low to High.

The switch element control circuit 116 becomes in the set state (the first state) again to turn off the second switch element 120 and the third switch element 121 of low-potential-side and to turns on the switch element 119 of high-potentialside. A current is supplied from the external power supply 104 to the filter capacitor 124 and the external load (not shown) through the input terminal 117, the first switch element 119, and the inductor 123. The inductor current IL(t) increases with time t, and energy is accumulated in the inductor 123.

The above operations are repeated. When the circuit becomes in an equilibrium operation state, the minimum value of triangular-shaped currents flowing from the current comparator 114 is equal to the reference current $I_{REF}$.

Thus, the power supply monitors the current flowing to the third switch element 121 of low-potential-side to control the minimum value of the triangular-shaped currents flowing to the inductor 123.

Figure 2:
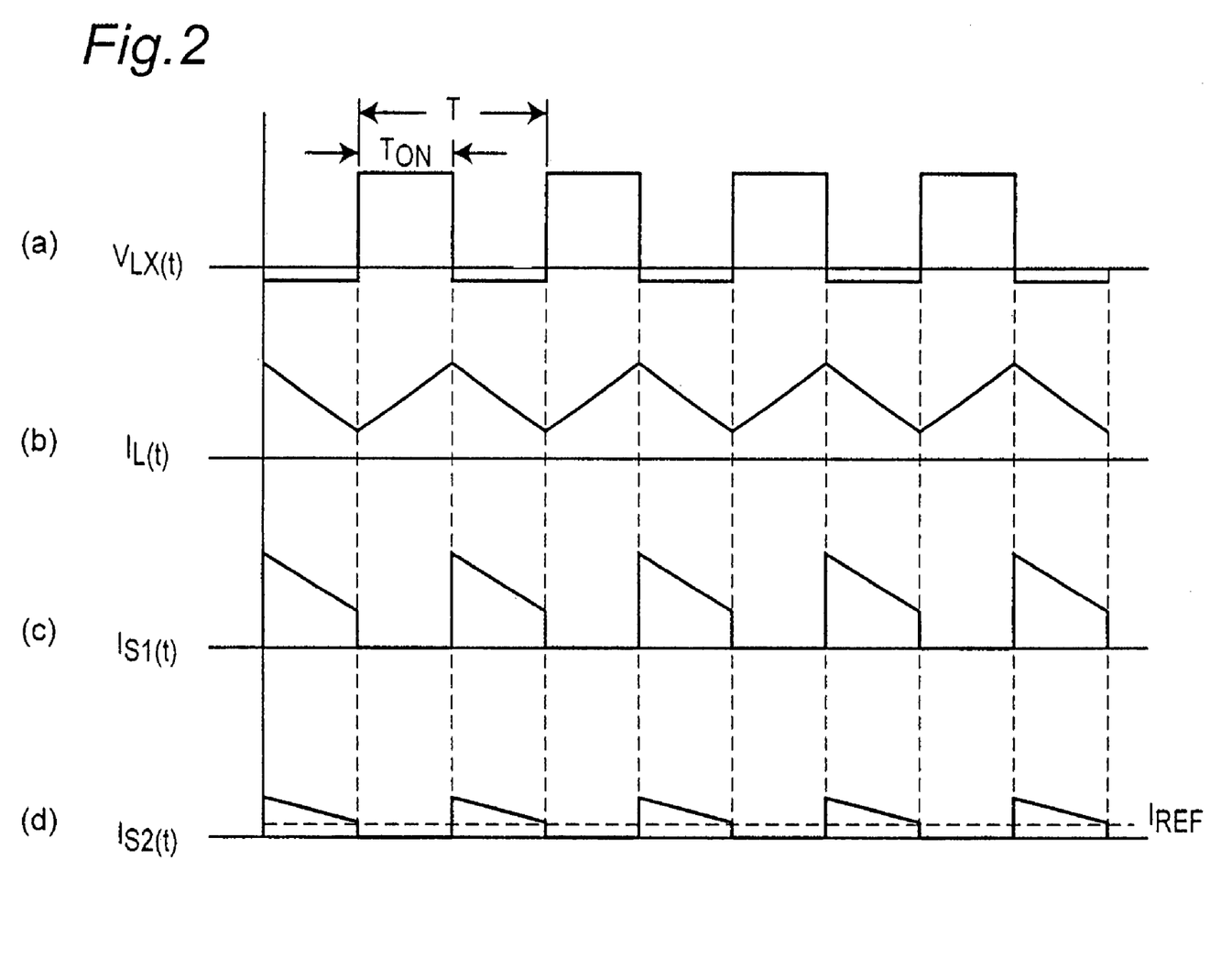
FIG. 2 is a timing chart showing an operation in the embodiment 1 of the present invention.

FIG. 2 is a timing chart showing the first state and the second state in the embodiment 1. FIG. 2(a) shows a voltage VLX(t) of the connection point 122 between the first and second switch elements. FIG. 2(b) shows the inductor current IL(t) flowing to the inductor 123. FIG. 2(c) shows a current IS1(t) flowing to the second switch element 120. The direction of a current flowing from the ground potential side to the inductor side is set as a positive direction. FIG. 2(d) shows the current IS2(t) flowing to the third switch element 121. The direction of a current flowing from the current comparator 114 to the inductor side is set as a negative direction.

In a period $T_{ON}$ (the first state) in which the first switch element 119 of input voltage side is turned on, the voltage VLX(t) of the connection point 122 of the inductor 123 approximates to the input voltage $V_{IN}$, and the inductor current IL(t) increases with time.

The period $T_{ON}$ comes to an end after the predetermined time has elapsed, and the second switch element 120 of ground potential-side is turned on (second state). The voltage VLX(t) of the connection point 122 approximates to the ground potential, and the inductor current IL(t) decreases with time. At this time, the current is supplied from the ground terminal 118 through the second switch element 120, and the current IS1(t) flows in the second switch element 120.

The third switch element 121 is turned on in a period equal to the period in which the second switch element 120 is turned on. Depending on a ratio of the mutual conducting resistances, the current IS2(t) flows in the third switch element 121. The current IS2(t) decreases with time in proportion to the current IS1(t).

When the current IS2(t) is smaller than the value reference current $I_{REF}$ of the reference current source 113, the output of the current comparator 114 is switched, the first switch element 119 is turned on, and the second switch element 120 and the third switch element 121 is turned off. The power supply alternately repeats the two states.

Accuracy of current detection in the embodiment 1 of the present invention will be described below. The inductive load current control circuit according to the embodiment 1 of the present invention directly compares the current flowing to the third switch element 121 having a conducting resistance set at a predetermined ratio to the conducting resistance of the second switch element 120 with the reference current $I_{REF}$. Any elements closely arranged on monolithic semiconductors made by the same process can have the ratio of conducting resistances at a higher accuracy than absolute values. As the second switch element 120 and the third switch element 121 according to the embodiment, elements closely arranged on monolithic semiconductors made by the same process are used. Thus, the terminal voltages of the second switch element 120 and the third switch element 121 are substantially kept equal. Therefore, the inductive load current control circuit and the power supply according to the present invention can detect currents with high accuracy.

In the present invention, since the current comparator 114 directly compares the current IS2(t) to be detected with the reference current $I_{REF}$, the current detecting amplifier 501 in the conventional technique shown in FIG. 5 is not necessary. According to the conventional technique, when the current detecting amplifier 501 is used, an individual error of current detection is caused by fluctuations of input offset voltages and gains. However, the present invention can eliminate the factor of the error. Therefore, in the embodiment 1 of the present invention, a current can be detected with high accuracy.

In the present invention, since a resistor for current detection is not used, a power loss can be reduced, and power efficiency can be made high.

Embodiment 2

Figure 3:
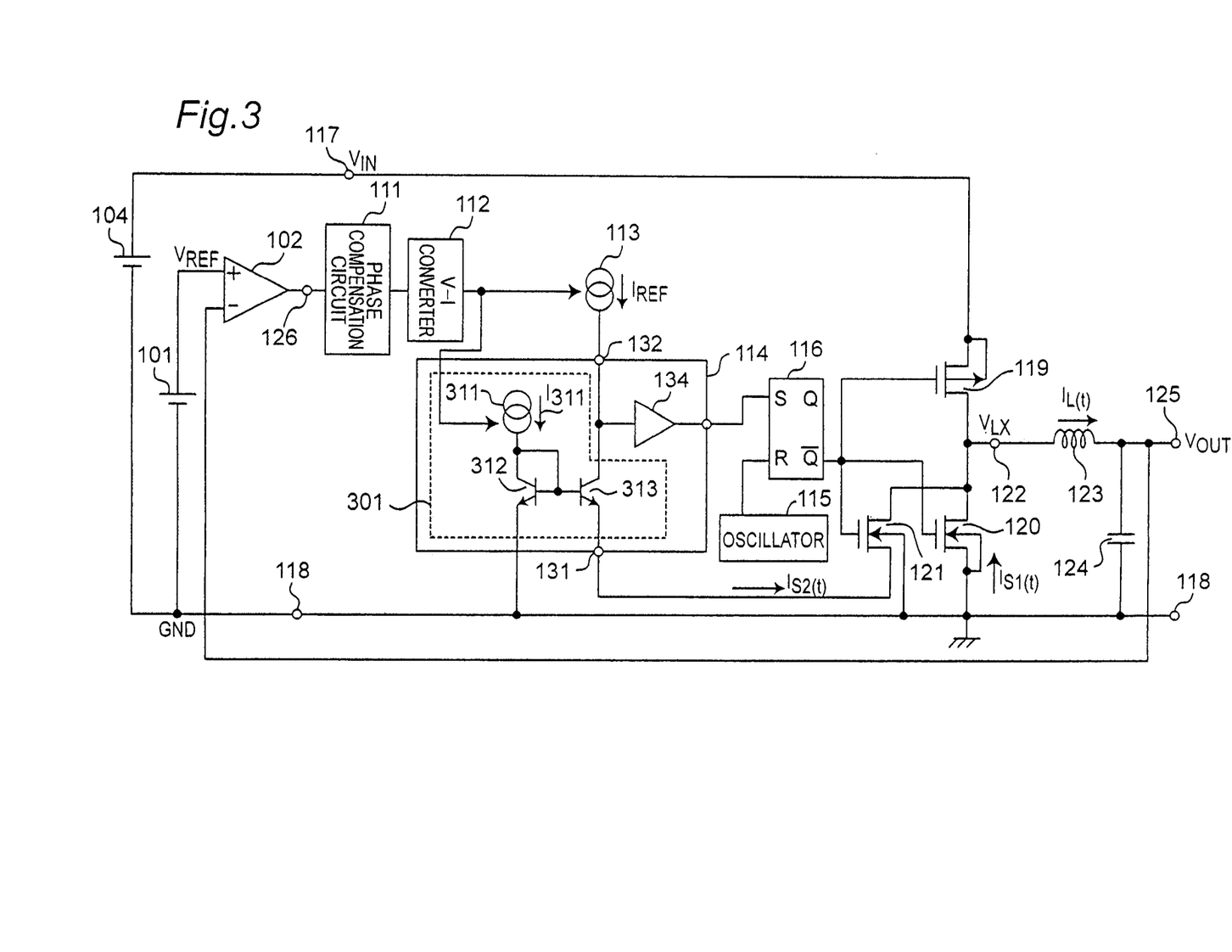
FIG. 3 is a diagram showing the configuration of a power supply according to an embodiment 2 of the present invention.

An inductive load current control circuit and a power supply according to an embodiment 2 of the present invention will be described below with reference to FIG. 3. FIG. 3 is a diagram showing the configuration of the power supply according to the embodiment 2 of the present invention. The power supply according to the embodiment 2 is different from that according to the embodiment 1 shown in FIG. 1 in that a voltage stabilizing circuit 301 in FIG. 3 is used in place of the voltage stabilizing circuit 133 in FIG. 1. Since other configuration in the embodiment 2 is the same as that in the embodiment 1, the same reference numerals are used, and a description is omitted.

The voltage stabilizing circuit 301 according to the embodiment 2 has a reference current source 311 connected to the voltage-current converter 112, a transistor 312 having a base and a collector which are connected to the output terminal of the reference current source 311 and an emitter connected to the ground terminal 118, and a transistor 313 having a base connected to the base and collector of the transistor 312, a collector connected to the input terminals of the current input terminal 132 and the buffer amplifier 134, and an emitter connected to the current output terminal 131.

The reference current source 311 outputs a current $I_{311}$ which is in proportion to the reference current $I_{REF}$ output from the reference current source 113.

The transistors 312 and 313 have equal current driving capabilities or current driving capabilities set at a predetermined ratio, and are bipolar transistors which have the same characteristics. The transistor 312 causes the current $I_{311}$ to flow from the collector to the emitter. The base voltage of the transistor 313 is given by the base voltage of the transistor 312.

The voltage-current converter (V-I converter) 112 controls the current driving capabilities of the reference current sources 113 and 311 such that the current driving capabilities are kept equal or kept at a predetermined ratio. When the reference current sources 113 and 311 cause the equal currents or the currents set at the predetermined ratio to flow to the transistors 313 and 312, respectively, the operation conditions of the transistors 313 and 312 are set to be equal to each other. Therefore, the emitter potential of the transistor 313, that is, the potential of the current output terminal 131 is always equal to the ground potential which is the emitter potential of the transistor 312.

When the current IS2(t) flowing from the current output terminal 131 is larger than the reference current $I_{REF}$, the collector potential of the transistor 313 approximates to the ground potential. When the current IS2(t) flowing from the current output terminal 131 is smaller than the reference current $I_{REF}$, the collector potential approximates to the input voltage $V_{IN}$. The buffer amplifier 134 outputs a binary value as an output from the current comparator 114 depending on the collector Voltage.

The power supply according to the embodiment 2 has the same effect as the power supply according to the embodiment 1. Although the bipolar transistors are used as the transistors 312 and 313 in the embodiment 2, the same effect can be obtained even when the bipolar transistors are replaced with FETs.

Embodiment 3

Figure 4:
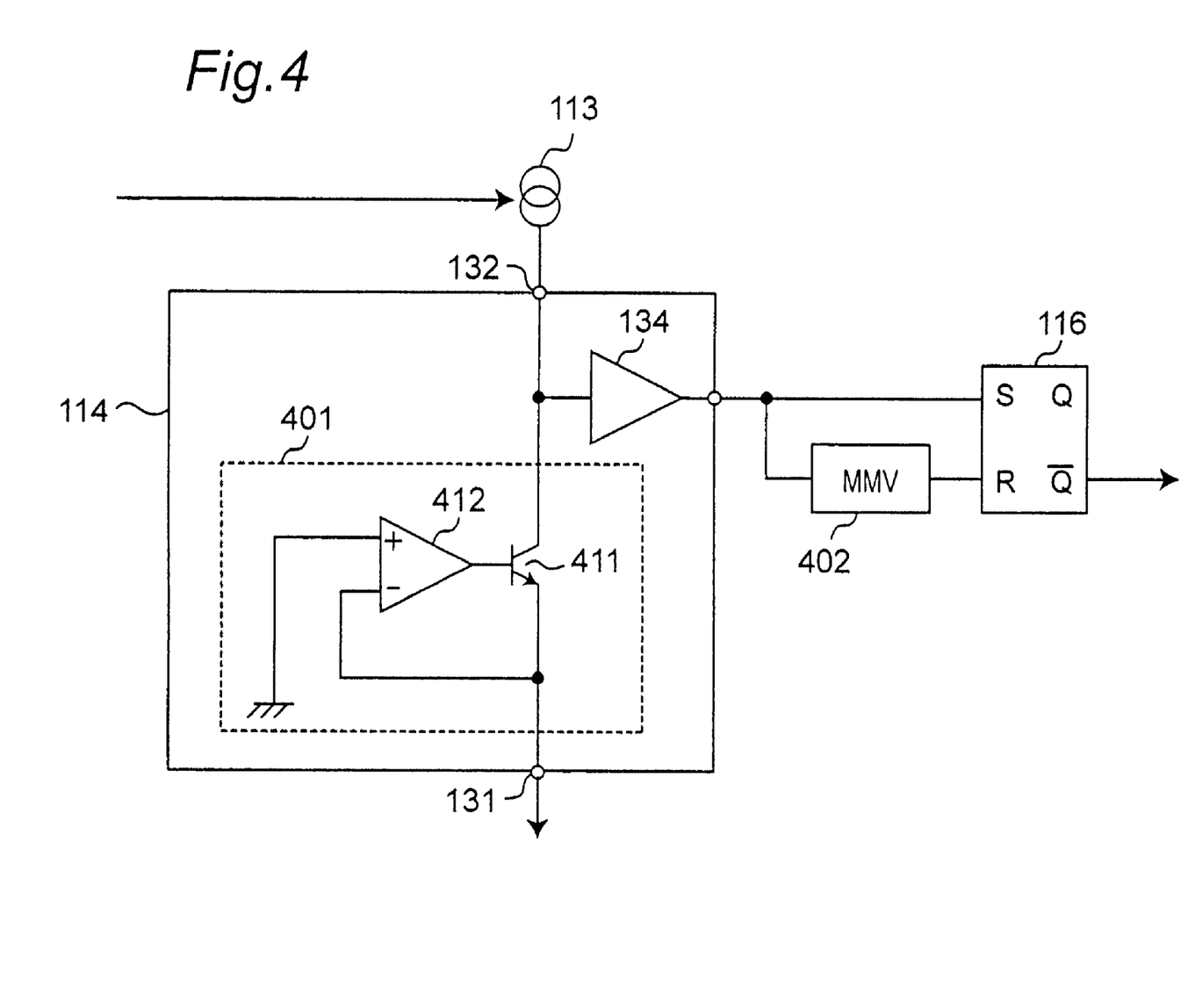
FIG. 4 is a diagram showing a voltage stabilizing circuit, a mono multivibrator, and a peripheral circuit according to an embodiment 3 of the present invention.

An inductive load current control circuit and a power supply according to an embodiment 3 of the present invention will be described below with reference to FIG. 4. FIG. 4 is a diagram showing a configuration of a voltage stabilizing circuit, a mono multivibrator, and a peripheral circuit according to the embodiment 3 of the present invention. The inductive load current control circuit and the power supply according to the embodiment 3 are different from those in the embodiment 1 or the embodiment 2 in that a voltage stabilizing circuit 401 and a mono multivibrator (MMV) 402 shown in FIG. 4 are used in place of the voltage stabilizing circuits 133 and 301 and the oscillator 115 in FIGS. 1 and 3. Since other configuration in the embodiment 3 is the same as that in the embodiment 1 or the embodiment 2, the same reference numerals are used, and a description is omitted.

The voltage stabilizing circuit 401 according to the embodiment 3 has a transistor 411 having a collector connected to the current input terminal 132 and the input terminal of the buffer amplifier 134 and an emitter connected to the current output terminal 131, and an operational amplifier 412 of single power supply type having an output terminal connected to a base of the transistor 411. A non-inverted input terminal of the operational amplifier 412 is grounded, and an inverted input terminal of the operational amplifier 412 is connected to the current output terminal 131. The operational amplifier 412 operates such that the voltage of the current output terminal 131 is equal to the ground potential.

The transistor 411 is a bipolar transistor. The base voltage of the transistor 411 is given by an output from the operational amplifier 412. A current IS2(t) flowing from the current output terminal 131 is larger than a reference current $I_{REF}$, the collector voltage of the transistor 411 approximates to the ground potential. When the current IS2(t) flowing from the current output terminal 131 is smaller than the reference current $I_{REF}$, the collector potential of the transistor 411 approximates to an input voltage $V_{IN}$. The buffer amplifier 134 outputs a binary value depending on the collector voltage as an output from the current comparator 114.

The mono multivibrator 402 is triggered to output Low when an output voltage from the buffer amplifier 134 is switched from Low to High, and outputs High after a predetermined period of time.

The switch element control circuit 116 is an edge-trigger set/reset flip-flop which has a set terminal input an output from the current comparator 114 and a reset terminal input an output from the mono multivibrator 402. The switch element control circuit 116 in the embodiment 3 performs the same operation as that in the embodiment 1 or the embodiment 2.

An operation of a step-down DC-DC converter using the inductive load current control circuit according to the embodiment 3 will be described below. Since the elements not shown in FIG. 4 of the power supply (DC-DC converter) of the embodiment 3 are the same as those in the embodiment 1 (FIG. 1) or the embodiment 2 (FIG. 3), the step-down DC-DC converter will be described below by using the elements shown in FIG. 1 or 3.

The current comparator 114 is set to output High at a start-up. At the start-up, the mono multivibrator 402 is triggered, and the switch element control circuit 116 is set in a set state (a first state: a charging state).

In the first state, the switch element control circuit 116 turns on the first switch element 119 of high-potential-side and turns off the second switch element 120 and the third switch element 121 of low-potential-side. A current is supplied from the external power supply 104 to the filter capacitor 124 and an external load through the input terminal 117, the first switch element 119, and the inductor 123. The inductor current IL(t) increases with time t, and energy is accumulated in the inductor 123.

When a predetermined time has passed, an output voltage from the mono multivibrator 402 is switched from Low to High. The switch element control circuit 116 is set in a reset state when the output voltage from the mono multivibrator 402 is inputted to the reset terminal. The switch element control circuit 116 turns off the first switch element 119 of high-potential-side and turns on the second switch element 120 and the third switch element 121 of low-potential-side (a second state: a discharging state).

In the second state, an inductor has such characteristic that the inductor current continuously flows while holding a previous state by the energy accumulated in the inductor 123 at the first state. The inductor current is supplied from the ground terminal 118 to the external load through the switch element of the switch element 120 of low-potential-side and the inductor 123. When the second switch element 120 is turned from off to on, the current IS2(t) flowing to the third switch element 121 is larger than the reference current $I_{REF}$. The current comparator 114 outputs Low. In this state, the inductor current decreases with time.

The current comparator 114 compares the current IS2(t) flowing from the current output terminal 131 to the third switch element 121 with the reference current $I_{REF}$ to output a comparison result. In the second state, when the current IS2(t) flowing to the third switch element 121 is smaller than the reference current $I_{REF}$, the output voltage from the current comparator 114 is switched from Low to High. The mono multivibrator 402 is triggered, and the switch element control circuit 116 is set in the set state (the first state) again.

The switch element control circuit 116 turns off the second switch element 120 and the third switch element 121 of low-potential-side and turns on the first switch element 119 of high-potential-side. A current is supplied from the external power supply 104 to the filter capacitor 124 and the external load through the input terminal 117, the first switch element 119, and the inductor 123. The inductor current IL(t) increases with time t, and energy is accumulated in the inductor 123.

The above operations are repeated. When the circuit becomes in an equilibrium operation state, the minimum value of triangular-shaped currents flowing in the current comparator 114 is equal to the reference current $I_{REF}$.

Thus, the power supply monitors the current flowing to the third switch element 121 of low-potential-side to control the minimum value of the triangular-shaped currents flowing to the inductor 123.

In place of the reference current sources 113 in the embodiments 1 to 3, a reference power source which has a voltage source and a resistor connected in series with each other to obtain a predetermined current from one terminal of the resistor may be used.

In the embodiments 1 to 3, the reference current source 113 which generates a reference current and the voltage-current converter 112 are independent circuits each other. The two circuits may be replaced with one voltage-current converter to perform the operation by directly using an output current from the voltage-current converter as a reference current. Furthermore, although it is explained that a voltage converter is used as the error amplifier 102 and an oscillation preventing measure is performed by the phase compensation circuit 111, the oscillation preventing measure may be performed as required and may not be always performed. Therefore, when the oscillation preventing measure is not necessary, the three circuits, that is, the error amplifier 102, the voltage-current converter 112, and the reference current source 113 in each of Embodiments 1 to 3 can also be replaced with one voltage-current converter to perform the operation by using an output current from an error amplifier constituted by the voltage-current converter as a reference current.

In the Embodiments 1 to 3, the current comparator 114 outputs a binary value. In place of the binary value, the switch element control circuit 116 may binarize an analog voltage output from the current comparator.

The inductive load current control circuits according to the Embodiments 1 to 3 use the voltage stabilizing circuits 133, 301, and 401, respectively. However, the voltage stabilizing circuits may not be used. Since a current detection accuracy becomes high when the voltage stabilizing circuit is used, the voltage stabilizing circuit is preferably arranged.

As described above, the inductive load current control circuit and the power supply according to the present invention are useful for accurately detecting a current flowing to an inductive load without power loss. The present invention can be widely used as not only a step-down DC-DC converter but also a circuit for controlling a current in an inductive load such as a motor control inverter. For example, when the inductor 123 is replaced with a stator winding of a motor, the inductive load current control circuit according to the present invention can be used as a motor driving circuit.

INDUSTRIAL APPLICABILITY

The present invention is useful to an inductive load current control circuit which controls a current in a conductive load and a power supply.

The invention claimed is:

1. An inductive load current control circuit comprising:
an input terminal that inputs an input voltage;
an output terminal that outputs an output voltage;
a reference power source that is a current source having a current driving capability of outputting a reference current;
first and second switch elements that are connected in series between the input terminal and a ground potential;
an inductive load that has one terminal connected to a connection point between the first switch element and the second switch element, and another terminal connected to the output terminal to output the output voltage;
a third switch element that has one terminal connected to the connection point between the first switch element and the second switch element;
a current comparator that has one terminal connected to an output terminal of the reference power source and another terminal connected to another terminal of the third switch element, the current comparator comparing a current driving capability of the third switch element with a current driving capability of the reference current to decide and output a magnitude relation; and
a switch element control circuit that alternately controls a first state and a second state and controls transition from the second state to the first state according to an output of the current comparator,
in the first state, the first switch element being turned on and the second switch element and the third switch element being turned off to cause a current to flow from the input voltage to the inductive load,
in the second state, the first switch element being turned off and the second switch element and the third switch element being turned on to cause a current to flow from the ground potential to the inductive load through the second switch element by energy accumulated in the inductive load at the first state.

2. The inductive load current control circuit according to claim 1, wherein
the reference power supply has a voltage source and a resistor that are connected in series, and provides a predetermined current from one terminal of the resistor.

3. The inductive load current control circuit according to claim 1, wherein
the reference power supply is a reference current source having a current driving capability of outputting a predetermined reference current, and the inductive load current control circuit controls an output voltage of the inductive load by controlling an amount of the current driving capability of the reference current source.

4. The inductive load current control circuit according to claim 1, wherein
the second switch element and the third switch element are transistors, and conductive resistances of the transistors are set such that a current flowing to the third transistor is smaller than a current flowing to the second transistor.

5. The inductive load current control circuit according to claim 1, wherein
the current comparator has a transistor that has one terminal connected to the reference power source, another terminal connected to the other terminal of the third switch element and a control terminal, when the control terminal being supplied with a predetermined voltage, the transistor operating such that a potential of a connection point between the other terminal of the transistor and the other terminal of the third switch element approximates to a ground potential, and
the current comparator outputting a potential of an arbitrary point between the reference power source and one terminal of the transistor or a binary value of the potential as a comparison result.

6. A power supply comprising:
a reference voltage generating section that outputs a reference voltage;
the inductive load current control circuit according to one of claims 1 to 5; and
an error amplifier that compares the reference voltage with the output voltage of the inductive load current control circuit to output an error voltage obtained by amplifying a difference voltage between the reference voltage and the output voltage, wherein
the power supply controls a value of the reference current in the inductive load current control circuit to decrease the absolute value of the error voltage.

* * * * *